United States Patent Office 3,367,973
Patented Feb. 6, 1968

3,367,973
GLYOXAL MONOALKYL HEMIACETAL
Charles H. Schramm and Morris Zief, Easton, Pa., assignors to J. T. Baker Chemical Company, Phillipsburgh, N.J., a corporation of New Jersey
No Drawing. Filed Sept. 27, 1963, Ser. No. 311,956
5 Claims. (Cl. 260—602)

This invention relates to a stable derivative of glyoxal. In a particular aspect, this invention relates to glyoxal monoalkyl hemiacetal which is a stable compound and which decomposes readily into free glyoxal in acid solution.

It has been discovered that a stable glyoxal monoalkyl hemiacetal can be produced by a process which comprises reacting dihaloethylene carbonate with alkali metal alkoxide as illustrated by the following reaction scheme:

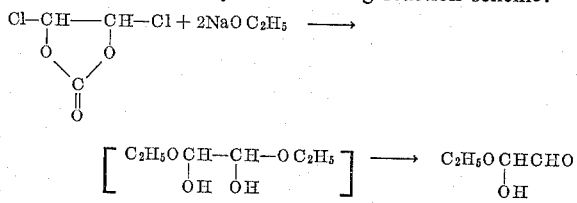

Production of glyoxal monoalkyl hemiacetal appears to proceed through an unstable diacetal intermediate. Alkanol is split out of the unstable intermediate to form the stable glyoxal monoalkyl hemiacetal of the present invention.

The reactants may be employed in any proportions but it is most convenient to use approximately the stoichiometric amounts, i.e., between about 1.5 to 2.5 moles of alkali metal alkoxide per mole of dihaloethylene carbonate. The reaction is conveniently conducted in an inert solvent such as ethanol, ethyl acetate, tetrahydrofuran and other solvents having suitable solubility characteristics to qualify as a medium for the reaction. The reaction can be conducted at a temperature between about 0 and 100° C.

The dihaloethylene carbonate reactant is preferably dichloroethylene carbonate or dibromoethylene carbonate. Any alkali metal alkoxide may be employed, with the preferred compounds being the sodium, potassium and lithium alcoholates of methanol, ethanol, propanol, butanol and the like.

The glyoxal monoalkyl hemiacetal product produced by the process is easily recovered in the form of colorless oils by distillation at a reduced pressure.

The recovery of the product of the present invention as a monomer is surprising in view of the ease with which alphahydroxy aldehydes dimerize. For example, dimerization of diglyoxal monoethyl hemiacetal would yield 2,5-dihydroxy-3,6-diethoxy-1,4-dioxane.

The compounds of the present invention are useful in that they represent a stable form of glyoxal which is at present only available in aqueous solution. The hemiacetal compounds of the present invention are readily converted into free glyoxal by adding the compounds to an aqueous acid solution.

The following example will illustrate specific embodiments of the present invention.

Example

Sodium (18.4 grams, 0.8 mole) was dissolved in 300 milliliters of ethanol. Dichloroethylene carbonate (62.8 grams, 0.4 mole) was added to the ethanolic solution with stirring at a temperature of 3° C. The reaction mixture was permitted to stand at room temperature overnight. After the precipitate which formed was filtered off, the solvent was removed in vacuo. Glyoxal monoethyl hemiacetal was recovered as a colorless oil boiling at 50°–54° C. at 9 millimeters of mercury pressure, $n_D^{25}$, 1.4230.

The product was soluable in water, ethyl alcohol and ethyl ether. It decolorized potassium permanganate and gave a positive Tollen's test. Negative tests were obtained with aqueous silver nitrate and carbon tetrachloride solution of bromine. Infrared analysis indicated absorption at $2.8\mu$(OH), $5.6\mu$(C=O) and $9.0\mu$(C—O—C).

A molecular weight of 120 (theory 104) was found by determining the increase in boiling point of chloroform solution in a Cottrell apparatus as modified by Washburn and Read.[1]

Analysis.—Calc. for $C_4H_8O_3$: C, 46.15; H, 7.69. Found: C, 45.86; H, 7.85.

The 2,4-dinitrophenylhydrazone derivative of the compound had a melting point of 318° C. A mixed melting point with glyoxal bis-2,4-dinitrophenylhydrazone showed no depression.

In the same manner, glyoxal monomethyl hemiacetal, glyoxal monopropyl hemiacetal, glyoxal monobutyl hemiacetal are produced by substituting sodium methoxide, sodium propoxide and sodium butoxide, respectively, for sodium ethoxide in the above procedure.

What is claimed is:
1. Glyoxal monoethyl hemiacetal.
2. A method for producing a glyoxal monoalkyl hemiacetal having from 1 to 4 carbon atoms in said alkyl group which comprises reacting a 4,5-dihaloethylene carbonate with an alkali metal alkoxide, said alkoxide having from 1 to 4 carbon atoms.
3. A glyoxal monoalkyl hemiacetal wherein the alkyl has from 1 to 4 carbon atoms.
4. A method for producing a glyoxal monoalkyl hemiacetal wherein said monoalkyl has from 1 to 4 carbon atoms which comprises reacting at a temperature of from about 0° C. to 100° C. 4,5-dichloroethylene carbonate with sodium alkoxide wherein said alkoxide has from 1 to 4 carbon atoms.
5. A method for producing a glyoxal monoalkyl hemiacetal wherein said monoalkyl has from 1 to 4 carbon atoms which comprises reacting at a temperature of from about 0° C. to 100° C. a 4,5-dihaloethylene carbonate wherein each halo substituent has an atomic weight of from 35 to 80, with an alkali metal alkoxide wherein said alkoxide has from 1 to 4 carbon atoms.

[1] E. W. Washburn and J. W. Read, J. Am. Chem. Soc., 41, 729 (1919).

References Cited

Post, "Chemistry of the Aliphatic Orthoesters" (1943), p. 56.
Karrer, "Organic Chemistry" (1950), p. 162.
Wagner et al., "Synthetic Organic Chemistry" (1953), p. 287.

LEON ZITVER, Primary Examiner.
BERNARD HELFIN, Examiner.
R. LILES, J. J. SETELIK, Assistant Examiners.